United States Patent [19]
Yagi et al.

[11] Patent Number: 4,885,944
[45] Date of Patent: Dec. 12, 1989

[54] TORQUE SENSOR

[75] Inventors: Toru Yagi; Hideo Matsuki, both of Saitama, Japan

[73] Assignee: Honda Giken Kogyo Kabushiki Kaisha, Tokyo, Japan

[21] Appl. No.: 160,869

[22] Filed: Feb. 26, 1988

[30] Foreign Application Priority Data

Feb. 27, 1987 [JP] Japan .................................. 62-045818

[51] Int. Cl.$^4$ .............................................. G01L 3/10
[52] U.S. Cl. .................................................. 73/862.36
[58] Field of Search ........... 73/862.08, 862.33, 862.36, 73/862.32, 862.35

[56] References Cited

U.S. PATENT DOCUMENTS 4,364,278 12/1982 Horter et al. ..................... 73/862.36
4,711,134 12/1987 Kita .................................. 73/862.36

FOREIGN PATENT DOCUMENTS 0655868 1/1963 Canada ............................. 73/862.36
1296865 3/1987 U.S.S.R. ........................... 73/862.36
0862462 3/1961 United Kingdom ............. 73/862.35

Primary Examiner—Charles A. Ruehl
Attorney, Agent, or Firm—Lyon & Lyon

[57] ABSTRACT

A torque sensor comprising a magnetic amorphous film whose magnetostrictive characteristics vary with the amount of torque applied thereto and coils for detecting magnetostrictive variation disposed opposite the magnetic film and is detachably coupled with a shaft whose torque is to be measured. The shaft is cut into two halves and the unit has flange couplings connected to the one half of the shaft while receiving the other shaft half at its boss. The boss is elongated to form a tubular portion on which said magnetic film is affixed and an enclosure member houses the tubular portion. The coils are attached on the inner wall of the enclosure member to keep a distance from the film affixed on the tubular portion.

5 Claims, 4 Drawing Sheets

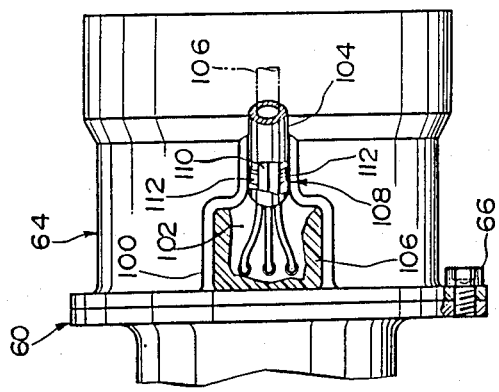
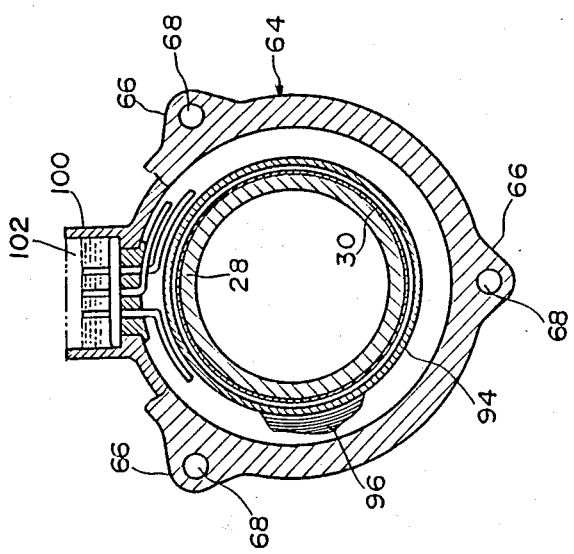

TORQUE SENSOR

BACKGROUND OF THE INVENTION

1. Field of the Invention

This invention relates to a torque sensor for detecting the torque of a rotating shaft, more particularly to a sensor suitable for measuring the torque of a drive shaft, steering shaft or other rotating shaft of an automobile and the like.

2. Description of the Prior Art

The indirect type torque sensor which measures the torque of a shaft by sensing the amount of twist therein is unable to measure static torque. Because of this inadequacy, there have recently been introduced a number of direct type torque sensors operating on the principle such an example as is of magnetostriction. As an example of such a torque sensor there can be mentioned the one described in Japanese laid-open patent publication No. 57(1982)-211030, wherein a ribbon-like magnetostrictive strip is wound on a shaft whose torque is to be measured.

The structure of the torque sensor disclosed by this publication requires that the magnetostrictive member be fixed directly on the shaft whose torque is to be measured so that the shaft itself becomes one component of the torque sensor. This is disadvantageous for several reasons. First, during manufacture of the torque sensor, it is generally necessary to attach the magnetostrictive member to a shaft of considerable length such as an automobile drive shaft, and this is difficult to do with high positional precision. Then, after the magnetostrictive member has been fixed on the shaft and up to the time that the shaft is installed in the vehicle, which is generally late in the assembly process, it is necessary to take great care in transporting and storing the shaft bearing the magnetostrictive member so as to protect the member from damage and adherence of dust or the like. The need to take these precautions greatly complicates the overall process of shaft installation.

Moreover, since the shaft whose torque is to be measured is involved as one component of the sensor, the sensor cannot be completed without mounting the other components on the shaft. As a result, it is not possible to adjust the gap between the magnetostrictive member and the associated coils until the assembly is carried out. Another disadvantage arises from the fact that drive shafts and other such automotive parts are only required to have adequate strength and are not required to have high dimensional precision. It therefore becomes necessary to use a special, separate adjustment means for adjusting the gap, which leads to further inconveniences as regards inventory control, performance control, maintenance and the like.

SUMMARY OF THE INVENTION

In view of the aforesaid shortcomings of the conventional torque sensors, it is an object of the present invention to provide a torque sensor which is constituted as an independent unit separate from the shaft whose torque is to be measured and in which the shaft is not involved as a component of the torque sensor.

Another object of the present invention is to provide a torque sensor wherein a magnetic element such as a magnetostrictive amorphous film is affixed on a member covered by a housing so as to protect it from damage at transportation, inventory and assembly while no special adjusting means is required for keeping the gap or distance between the film and detection coils to a predetermined value and which is enhanced in detection accuracy.

For realizing the objects, the present invention provides a torque sensor for measuring torque applied to a shaft comprising a flange coupled to the shaft. Said flange has a tubular portion for receiving magnetic element responsive to the shaft rotation. And, it further includes an enclosure member housing the tubular member independently of the rotation and holding means for detecting change of magnetic characteristics of the element to measure torque applied to the shaft.

The above and other features of the present invention will become apparent from the following description made with reference to the drawings.

BRIEF DESCRIPTION OF THE DRAWINGS

FIG. 2 is a sectional view of the same taken along line II—II in FIG. 1;

FIG. 3 is a plan view of a housing of the torque sensor shown in FIG. 1;

and

Figure 5:
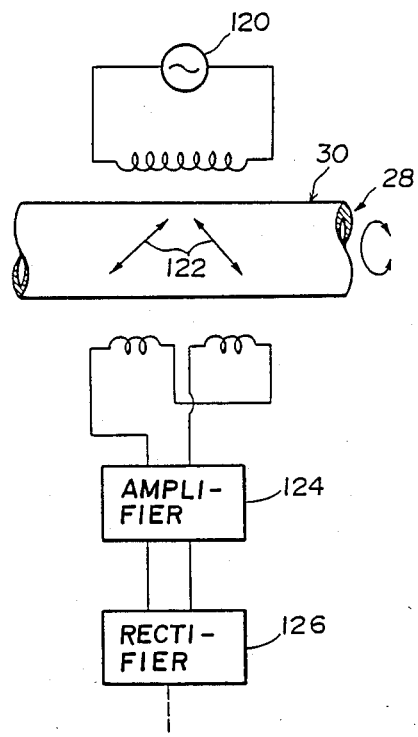

FIG. 5 is a block diagram illustrating the detection operation of the torque sensor according to the invention.

DESCRIPTION OF THE PREFERRED EMBODIMENTS

To begin with, a torque sensor according to the invention will be described with reference to FIGS. 1 to 5 inclusive.

Figure 1:
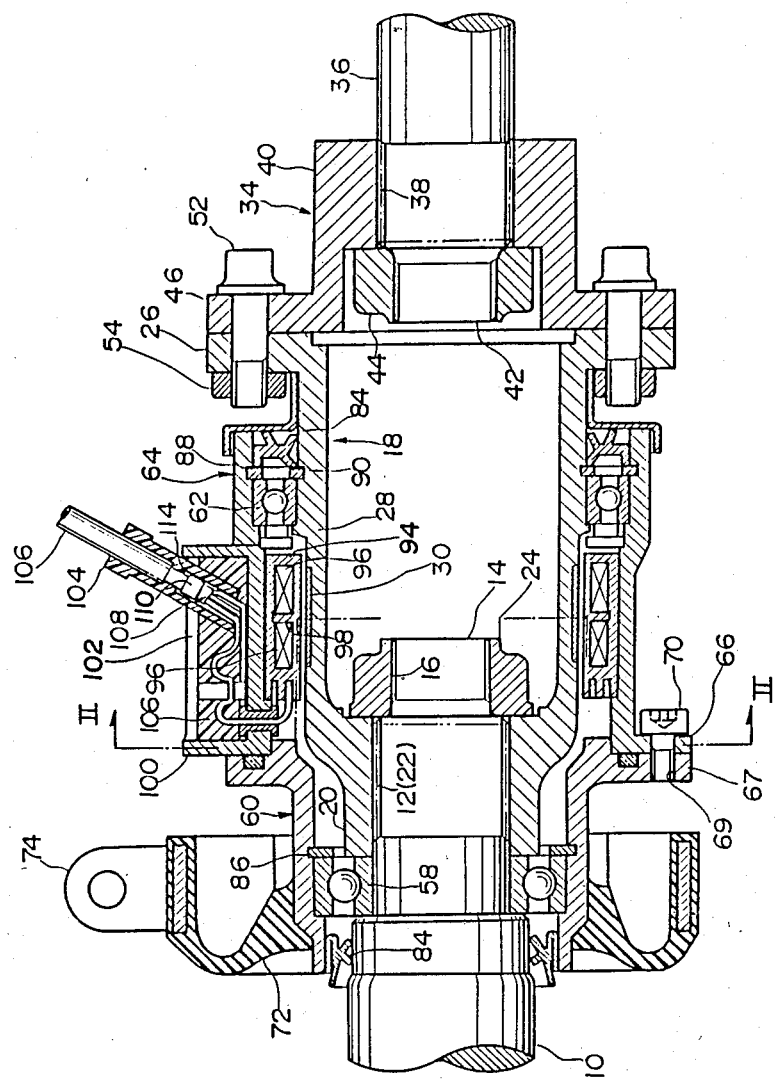
FIG. 1 is an axial sectional view of the torque sensor according to the invention mounted on a shaft whose torque is to be measured.

In FIG. 1, the reference numeral 10 designates one half of a shaft whose torque is to be measured cut into two halves at its appropriate part. The shaft is of relatively considerable length such an example as is a drive shaft for an automobile. The shaft half 10 decreases its diameter stepwise toward the end 14 and at a portion immediately before the end, is integrally formed with number of keys on surface for forming a splined portion 12. The shaft end 12 is formed with a threaded portion 16. Reference numeral 18 generally indicates a flange coupling half to be associated with the other half coupling 34. The coupling half 18 has a boss 20 which is made extremely elongated as illustrated and is formed with splines 22 in its hole so as to receive the external splined shaft half 10 therethrough. The threaded end 14 of the shaft half penetrating the boss is screwed by a nut 24 and is secured there. It should be noted that the tolerance allowed between the external and internal splines 12,22 formed at the shaft and boss hole be held to the absolute minimum in machining such that the splined shaft can be press fitted in the boss hole without producing any mechanical deformation thereof such that rotation along the axis of the shaft is fully transmitted to the boss without causing any slippage therebetween.

The elongated boss 20 of the coupling half forms a tubular portion 28. The tubular portion 28 is made hollow and is uniform in the inside diameter throughout its length. The thickness of the tubular portion is relatively small so as to be easily twisted. The tubular portion is formed with an annular recess on the midway to which a magnetic element such as a magnetic amorphous film 30 is affixed by an appropriate manner such as plating. The coupling half 18 faces the other coupling half 34 which receives the other half 36 of the shaft whose torque is to be measured. More specifically, the shaft half 36 is coupled to a boss 40 meshing its external splines 38 formed thereon with the mated internal splines formed in the boss hole. The threaded shaft end 42 penetrating the boss 40 is screwed by a nut 44 and thus rigidly fastened to the other coupling half 34. The two coupling halves are coupled with each other by fastening the flanges 26,46 via bolts 52 and nuts 54 through holes 48,50, as clearly illustrated in FIG. 4. Further, as illustrated, the two shaft ends are prevented from proceeding deeply in the tubular portion so as not to cause a bad influence on sensing accuracy.

Figure 4:
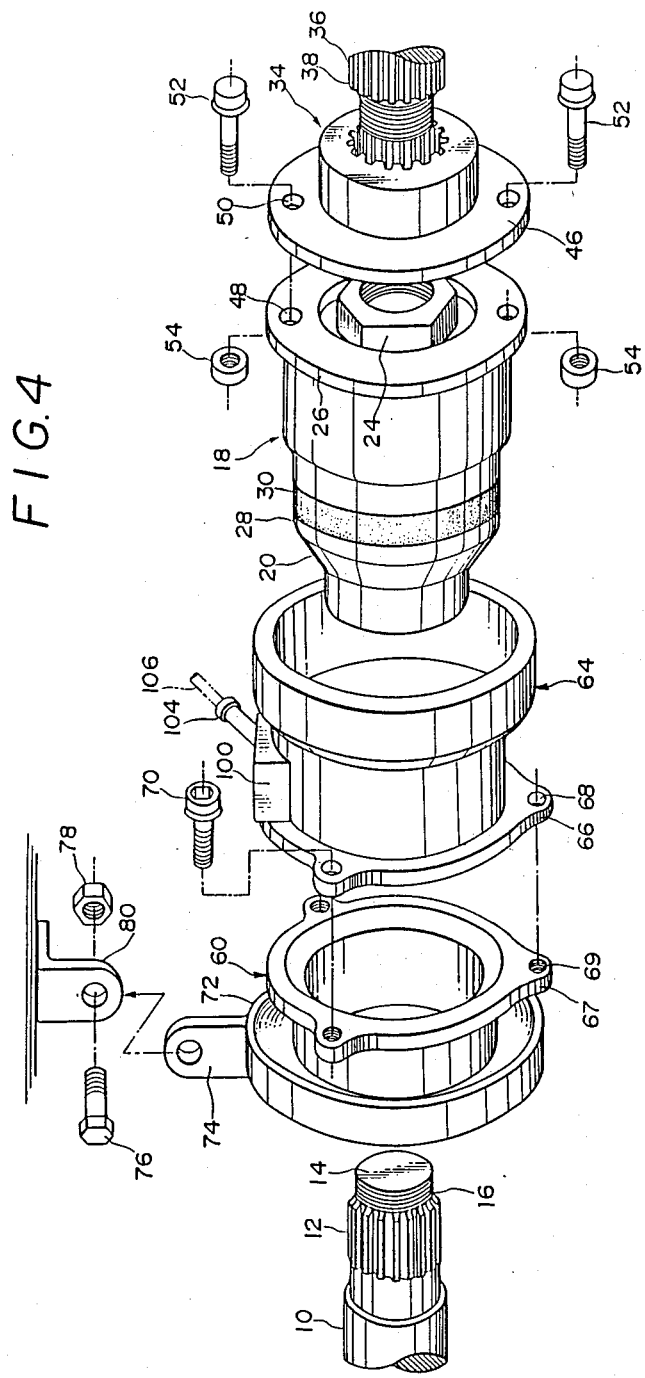
FIG. 4 is an explanatory perspective view showing how to attach the torque sensor to the shaft whose torque is to be measured.

A first bearing 58 is force fitted on the shaft half 10 at a portion adjacent to the external splines 12. Outward of the bearing 58 is provided a cover 60. The cover 60 is substantially of a cylindrical shape having a flange portion at its terminal end as best shown in FIG. 4. Similarly, a second bearing 62 is force fitted on the tubular portion 18 of the coupling half, and outward of the bearing, there is supported a housing or an enclosure member 64. The housing 64 has a configuration similar as the cover 60 and is also provided with a flange portion at its end. The cover 60 and the housing 64 can thus been flange coupled by screwing screws 70 in threaded holes 69 formed at three ear-like portions 67 extending outwardly from the cover flange portion through holes 68 formed at similar projections 66 extending from the housing flange portion. The cover and housing fastened together as a unit are thus coupled with the shaft half 10 via the bearing 58 and with the tubular portion via the bearing 62. The unit is also coupled with the other shaft half 36 through flange couplings. Therefore, the cover and housing are able to rotate independently of the shaft halves 10,36 or the tubular portion 18 coupled therebetween, so that when the shaft halves or the tubular portion rotates, they can be maintained stationary, in other words, can be prevented from rotating together therewith.

An annular wing 72 is provided along the cover 60. The wing 72 is made of an elastic material such as a rubber and is in a C-shape in cross section. A stay 74 is connected to the wing which in turn will be fastened to a bracket 80 mounted on a vehicle body through a bolt 76 and a nut 78, as will be explained at a later stage referring to FIG. 4. The wing 72 will absorb mechanical shock caused by the vehicle body, which might otherwise be directly transmitted to the sensor housing. Incidentally, in FIG. 1, the reference numeral 84 designates packings. The reference numerals 86,88,90 indicate rings provided adjacent to the bearings 58,62 for preventing lateral movement of the cover and housing through the bearings.

As shown in FIGS. 1 and 2, the housing 64 includes a bobbin 94 in a cylindrical shape which is attached along the housing inner wall. Excitation and detection coils 96 are wound around the bobbin. To be more specific, the bobbin is separated into two sections by a partition 98 and the excitation coil is firstly wound around both sections passing through a hole, not shown, formed at the partition. The detection coil is then wound on the excitation coil separately for each section. Alternatively, the detection coil may be wound first and then the excitation may be wound thereon.

The housing wall rises outwardly at a portion to form a projection 100. The end of the projection is opened to form a window 102 as is best shown in FIG. 3. The window 102 is filled up with plastics and a grommet 104 rests at the window frame and receives a harness 106. The harness extends from the exterior and ties wires connected to the coils 96. The grommet 104 houses a clamper 108 therein which comprises an annular pipe 110 split along its axis and two projections 112 stretching from the pipe laterally and slightly upwardly toward the grommet opening. The harness is firmly grasped by the clamper pipe 110 in the grommet. And, the distance or width between the ends of the two projections 112 in the direction perpendicular to the longitudinal axis of the grommet, is made larger than the inner diameter of a stepped portion 114 (FIG. 1) formed on the grommet bore wall. Therefore, when the harness 106 is subjected to unexpected external pulling force, since the projections are arranged to stretch laterally to the extent proportional to the pulling force, the projections will be blocked by the stepped portion 114. Thus, the harness 106 can be stably in kept in position in the grommet so that the wires in the harness are prevented from being disconnected from the coils 96.

Next, the mode of attaching or assembling of the torque sensor to the shaft whose torque is to be measured will be explained, followed by the mode of detection.

As shown in FIG. 4, passing the shaft half 10 through the cover 60 while fastening the cover 60 to the housing 64 with the screws 70, the elongated boss 20 of the coupling half 18 is then inserted in the housing 64 to receive the shaft half 10. The shaft half is spline coupled to the boss 20 and is secured by the nut 24. The other shaft half 36 is coupled with the other coupling half 34 at the other side. The two coupling halves 18, 34 are then fastened together with the bolts 52 and nuts 54. The housing 64 is finally fastened by the bolt 76 and nut 78 to the bracket 80 mounted on a vehicle body through the stay 74 extending from the wing 72.

When the assembling has been completed in this way, the excitation coil is excited by application thereto of current from an AC power source 120 as shown in FIG. 5. Any amount of torque applied to the shaft halves 10, 36 will be transferred to the tubular portion 28 as a torque of identical amount. Thus, as is well known, the compressive and tensile stress produced in the magnetic amorphous film 30 affixed on the portion will give rise to magnetostriction therein in the direction designated by the reference numeral 122. The detection coils sense the change in permeability resulting from magnetostriction caused by the aforesaid application of torque, and produce outputs corresponding to the electromotive force induced therein. The outputs are differentially extracted, appropriately amplified by an amplifier 124 and rectified by a rectifier 126. It then becomes possible to determine the rotational direction from the phase of the outputs and to determine the magnitude of torque from the output value. As the detection outputs are extracted by use of differential connection, the shaft halves will have no effect on the results of the measurement even if it is made from a ferromagnetic material.

In the embodiment, since the coils are made round or cylindrical along the housing wall, they can detect change of magnetostriction produced at the amorphous film over its entire surface on an average. Accordingly, even when the affixed film surface is uneven such that a distance between the film and the coils are not uniform all over the surface, the value detected at the unevenly spaced portion will then be averaged by those gathered at the other uniformly spaced portions. The error caused by unevenly affixed film can thus be compensated in proper.

Since the torque sensor according to the invention is realized as an independent unit which does not use the shaft whose torque is to be measured as one of its constituent elements, it need only to be attached to the shaft at some appropriate stage of the vehicle assembly operation. The flange coupling half to which the magnetic amorphous film is attached is considerably shorter than any of the shaft halves such as a drive shaft or the like and is therefore much easier to handle. Further, the fact that the magnetic amorphous film may be covered and protected by the housing results in an additional increase in operational efficiency since less care is necessary for protecting it from damage and the adherence of dust and the like during transport, storage and mounting. Moreover, since the coils are so-called "open-type" of cylindrical shape, the detected value is on an average which can effectively compensate for error caused by an unevenly affixed portion, if any, of the magnetic amorphous film. In addition, since only one flange couplings are used in the embodiment for coupling the shaft halves, the sensor is short and compact and is light in weight. While in the embodiments described in the foregoing, a magnetic amorphous material is used, the invention is not limited to this and may use any material exhibiting similar magnetic characteristics.

The present invention has thus been shown and described with reference to specific embodiments. However, it should be noted that the present invention is in no way limited to the details of the described arrangements but changes and modifications may be made without departing from the scope of the appended claim.

What is claimed is:

1. A torque sensor, comprising:
   a shaft whose tongue is to be measured, the shaft being divided into a first shaft half and a second shaft half;
   a tubular member with an open end for receiving the first shaft half therein and a flanged end for coupling with a flanged pipe which receives the second shaft half, such that the tubular member is twisted when the first and second shaft halves rotate in opposite directions;
   a magnetic element fixed on the tubular member;
   an enclosure member positioned around the tubular member independently of the shaft rotation, the enclosure member housing at least a portion of the tubular member at which the magnetic element is fixed; and
   detecting means positioned on an inner wall of the enclosure member for detecting changes of magnetic characteristics of the magnetic element to measure torque applied to the shaft.

2. A torque sensor according to claim 1, wherein said tubular member comprises a boss, the boss having an internally splined hole for receiving an externally splined portion of said first shaft half and being elongated to form a tubular portion adjacent said flanged end, said magnetic element being fixed on an outer wall of the tubular portion.

3. A torque sensor according to claim 2, wherein said enclosure member is supported on the tubular portion with bearings.

4. A torque sensor according to claim 3, wherein said magnetic element is a magnetostrictive amorphous film and said detecting means comprises coils which detect changes of the magnetostrictive characteristics generated at the film in response to stress applied thereto.

5. A torque sensor according to claim 4, wherein said coils are wound on an annular bobbin attached on an inner wall of the enclosure member at a fixed distance from the tubular portion on which said amorphous film is affixed.

* * * * *